US010868841B1

(12) United States Patent
Gu et al.

(10) Patent No.: US 10,868,841 B1
(45) Date of Patent: Dec. 15, 2020

(54) VOICE OVER INTERNET PROTOCOL (VOIP) CALL QUALITY

(71) Applicant: RingCentral, Inc., Belmont, CA (US)

(72) Inventors: Jinku Gu, Xiamen (CN); Guohua Yang, San Jose, CA (US); Hongjin Lin, Ningde (CN)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/888,190

(22) Filed: May 29, 2020

(51) Int. Cl.
*H04L 29/06* (2006.01)
*H04M 7/00* (2006.01)

(52) U.S. Cl.
CPC ...... *H04L 65/1069* (2013.01); *H04L 65/1006* (2013.01); *H04L 65/80* (2013.01); *H04M 7/006* (2013.01)

(58) Field of Classification Search
None
See application file for complete search history.

(56) References Cited

U.S. PATENT DOCUMENTS

| 8,228,861 | B1 | 7/2012 | Nix | |
| 2005/0198320 | A1* | 9/2005 | Chou | H04L 65/1006 709/228 |
| 2008/0144563 | A1 | 6/2008 | Hart | |
| 2011/0280387 | A1* | 11/2011 | Soo | H04M 3/56 379/202.01 |
| 2012/0236825 | A1* | 9/2012 | Otsuka | H04W 36/26 370/331 |

FOREIGN PATENT DOCUMENTS

| CN | 106716963 A | 5/2017 |
| CN | 108616756 A | 10/2018 |

OTHER PUBLICATIONS

PCT/ISA/210_PCT International Search Report PCT/CN2019/111953 dated Oct. 18, 2018 RingCentral, Inc. et al. 4 pages.
PCT/ISA/237_PCT Written Opinion of the International Searching Authority PCT/CN2019/111953 dated Oct. 18, 2018 RingCentral, Inc. et al. 4 pages.
PCT/ISA/220_PCT Notification of Transmittal of the International Search Report and the Written Opinion of the International Searching Authority, or the Declaration PCT/CN2019/111953 dated Oct. 18, 2018 RingCentral, Inc. et al. 1 pages.

* cited by examiner

*Primary Examiner* — Yaotang Wang

(57) ABSTRACT

A method for improving Voice over Internet Protocol (VoIP) call quality is disclosed. The method includes detecting, at a first computing device, a delay in receiving content data during a first media exchange. The first media exchange uses a first port. The method further includes automatically selecting a second port. The method also includes sending a port change notification featuring a port number of the second port to a second computing device. In some embodiments, the method further includes initiating a second media exchange using the second port.

20 Claims, 5 Drawing Sheets

VOICE OVER INTERNET PROTOCOL (VOIP) CALL QUALITY

CROSS-REFERENCE TO RELATED APPLICATIONS

This application is a continuation of and claims the benefit of prior-filed International Application No. PCT/CN2019/111953, filed on Oct. 18, 2019.

TECHNICAL FIELD

The present disclosure relates generally to the field of Voice over Internet Protocol (VoIP) connections. More specifically, and without limitation, this disclosure relates to systems and methods for improving call quality for VoIP connections.

BACKGROUND

Voice over Internet Protocol (VoIP) connections relies on network connectivity in order to provide telephony services. Network reliability and issues significantly impact call quality for VoIP. For example, many routers have a configuration that disrupts VoIP data transfer, resulting in poor call quality and dropped calls. As an illustrative example, a router using Network Address Translation (NAT) or a firewall may close certain communication ports resulting in packets being unable to reach their intended destination. In some examples, a User Datagram Protocol (UDP) that VoIP relies on is blocked by firewalls, resulting in packets being unable to reach their destination. In some examples, an unconfigured network may experience heavy bandwidth usage that prioritizes data traffic over Real-time Transportation Protocol (RTP) traffic that is used by VoIP calls, resulting in a decrease in call quality.

Some conventional systems optimize the router for VoIP connections in order to address the poor call quality and dropped calls. However, optimizing the router requires expert network knowledge and is often not an option for average users. Others, in an attempt to address call quality focus on whether the network has enough bandwidth by measuring latency, jitter, etc. Unfortunately, focusing on bandwidth does nothing to address a port being closed. Moreover, once it is determined that the issue is bandwidth, often the only remedy provided is to take necessary steps by increasing bandwidth, which does not address the call quality at that moment, resulting in a frustrating experience and poor client experience.

SUMMARY

The present disclosure addresses a real need to improve call qualities for VoIP connections. According to some embodiments, a VoIP connection is established using session initiation protocol (SIP) that uses UDP. Data packets are exchanged using protocols such as Real-time Transportation Protocol (RTP), which streams media data such as audio data in the case of VoIP connections. The exchange of RTP packets are monitored. It may be determined that there is a network problem if a RTP packet is not received within a certain window of time, e.g., 5 seconds, 3 seconds, 2 seconds, etc. impacting call quality. If RTP packets are not received within that window of time, then a different port may be used. The selection of the new port may be random. In some embodiments, there may be no need to initiate another SIP session to establish a new port assignment. Instead, the same SIP session will provide the necessary information to switch to a new port, establish a new RTP media stream, and signal the termination of the previous RTP media stream. Accordingly, call quality may be improved by automatically selecting a new port.

In some embodiments a method for improving Voice over Internet Protocol (VoIP) call quality is disclosed. The method includes detecting, at a first computing device, a delay in receiving content data during a first media exchange. The first media exchange uses a first port. The method further includes automatically selecting a second port. The method also includes sending a port change notification featuring a port number of the second port to a second computing device. In some embodiments, the method further includes initiating a second media exchange using the second port.

In some embodiments, the method further includes sending a first media exchange termination notification and terminating the first media exchange. In one illustrative example, the method further includes initiating a first Session Initiation Protocol (SIP) signaling session to initiate the first media exchange and initiating a second SIP signaling session. It is appreciated that in some embodiments, the delay meets or exceeds a predetermined time window threshold or exceeds a latency threshold. In some illustrative embodiments, automatically selecting the second port includes randomly selecting the port number from a set range of port numbers. It is appreciated that in some embodiments, the first media exchange and the second media exchange comprise an exchange of Real-time Transport Protocol (RTP) packets.

These and other features and aspects of the concepts described herein may be better understood with reference to the following drawings, description, and appended claims.

DETAILED DESCRIPTION

The example embodiments herein are directed to VoIP systems and establishing VoIP calls with improved call quality. According to some embodiments, a VoIP connection is established using SIP, which uses UDP. SIP is a connection management protocol that initiates a signaling stage of a VoIP call where a call is being initiated, codecs are being negotiated and a general transaction of a call is being established. Subsequently, data packets are exchanged using protocols such as RTP by initiating a media stream, which also uses UDP. It is appreciated that a port (e.g. UDP port) is selected for exchanging RTP packets during a VoIP call.

The exchange of RTP packets (e.g. RTP packets being received) is monitored. It may be determined that there is a network problem if a packet is not received within a certain window of time, e.g., 5 seconds, 3 seconds, 2 seconds, etc. For example, once a VoIP connection is established, if no RTP packet is received within a few seconds, then that might be an indication that the port that being used is closed or blocked, for example by the firewall. As another example, once a VoIP connection is established, RTP packets may be exchanged and at some point during the call, RTP packets may not be received within a certain window of time for various reasons such as an unconfigured network experiencing heavy bandwidth usage resulting in data traffic being prioritized over RTP traffic causing degradation in call quality. Accordingly, changing the port may alleviate the poor call quality if the original port was blocked by a firewall or if the port was experiencing heavy bandwidth usage due to data traffic being prioritized over RTP traffic.

As such, if RTP packets are not received within that window of time, then a different port is selected and used for exchanging RTP packets. The selection of a new UDP port may be random. For example, a new UDP port may randomly be selected, using a random algorithm, from a range of available ports. In some embodiments, the new UDP port may be selected based on a non-randomized equation. It is appreciated that in order to select a new UDP port responsive to detecting that no RTP packets have been received in a given window of time, another media stream may be initiated. Accordingly, there may be no need to initiate another SIP session but rather initiate only another media stream using the newly selected port. In some alternative embodiments, a new SIP session as well as a new media stream may be initiated. Accordingly, call quality may be improved by automatically selecting a new port.

The embodiments as described are advantageous over the conventional systems and routers because the embodiments automatically change the port if RTP traffic is not received within a given window of time. In comparison, in the case of a firewall, conventional methods require an administrator to circumvent the firewall by identifying the exact port number that the application is currently using, the source and destination networks, as well as whether the port uses Transmission Control Protocol (TCP), UDP, or both. In the case of a network that automatically prioritizes data traffic over RTP traffic, an administrator would need to provide a network Quality of Service (QoS) policy in order to prioritize RTP traffic over data traffic. Generally, these conventional methods take time to implement. Meanwhile, users experience a significant decrease in VoIP call quality. For example, VoIP calls will be dropped or blocked all together, while in other cases, interference may decrease the call quality. Implementing this improved method of automatically selecting a new port upon failing to detect RTP traffic will enable little to no interruptions in SIP sessions, expedient selection of new ports, and only minor interruptions in RTP media streams as the new port is selected, all with the effect of maximizing VoIP call quality.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Figure 1:
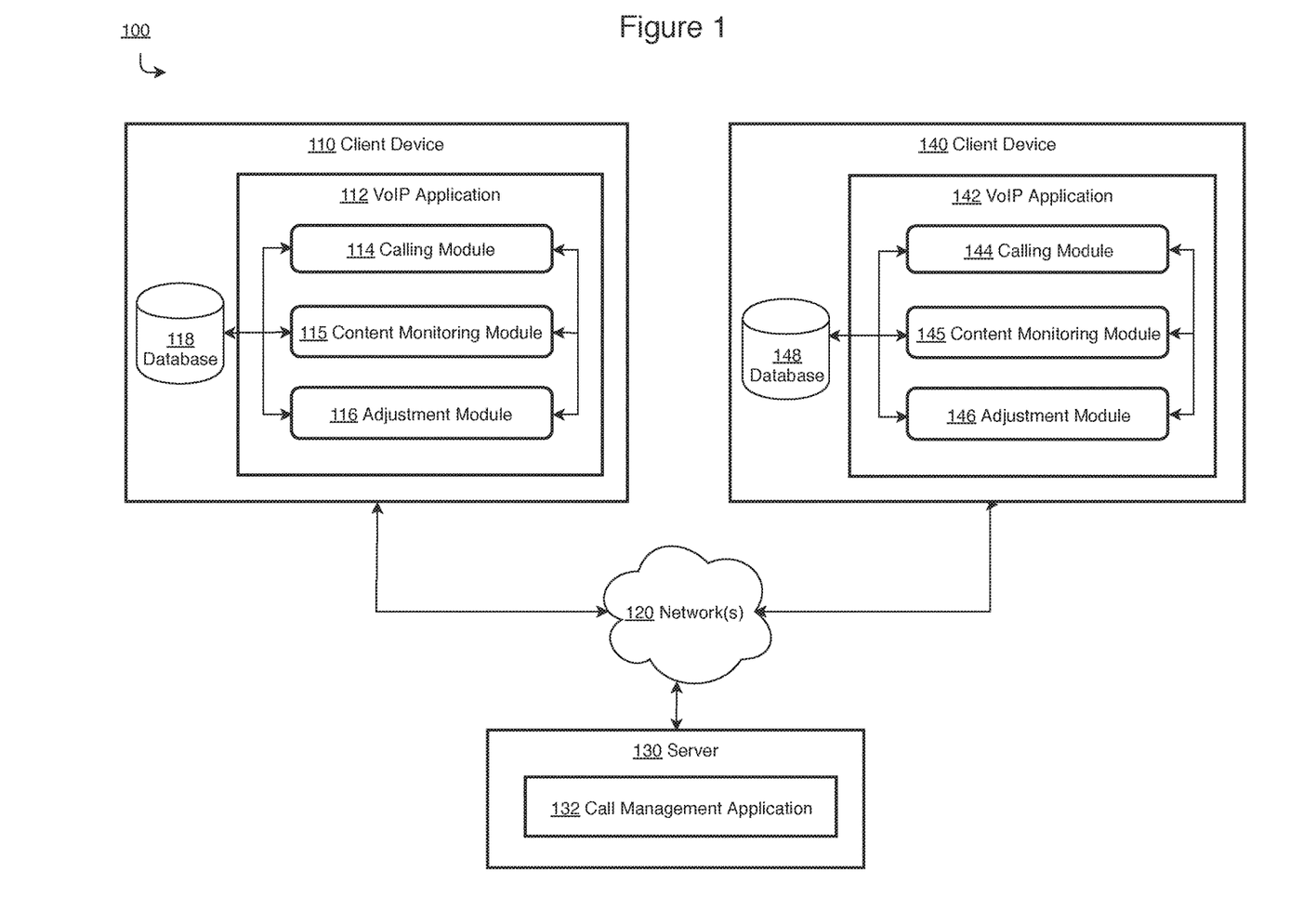
FIG. 1 is a block diagram depicting examples of a VoIP system, according to some embodiments.

Referring now to FIG. 1, a block diagram depicting an example of a VoIP system 100 that establishes a VoIP call in accordance to some embodiments is shown. The system may include client device(s) 110, 140 and a server 130. The server 130 is one or more server computing devices that are configured to execute a call management application 132 and manage VoIP communications. The call management application is any software program or combination of programs that enable call management through SIP, for example. Client devices 110, 140 may be any general or specialized computing device, such as desktop computers, laptop computers, telephones, smartphones, tablets, smart watches, or any other device configured to implement VoIP communications. Communication functions may be facilitated through one or more wired and/or wireless communication systems, which includes Ethernet port, radio frequency receivers and transmitters and/or optical (e.g., infrared) receivers and transmitters. The specific design and implementation of the wired and/or wireless communication system depends on the communication networks over which the client device 110 operates. The network 120 of FIG. 1 may be a combination of one or more local area networks (LANs), wide area networks (WANs), metropolitan area networks (MANs), or global interconnected internetworks, such as the public Internet.

The client devices 110, 140 of FIG. 1 are each configured to execute respective VoIP application(s) 112, 142, which are software programs or combination of programs that enable VoIP communications. The VoIP application is configured with one or more sets of instructions or modules. In the embodiment of FIG. 1, each VoIP application 112, 142 is configured with a calling module 114, 144, a content monitoring module 115, 145, and an adjustment module 116, 146 which work together to initiate VoIP calls, monitor for interruptions in VoIP calls, and makes automatic adjustments to compensate for the VoIP interruptions. In some embodiments, only one VoIP application 112 is configured with all three modules while the other VoIP application 142 only features the standard calling module 144. In the example of FIG. 1, the calling module 114, 144 performs standard VoIP calling operations like initiating and receiving SIP signaling sessions and exchanging RTP packets from endpoint to endpoint. The content monitoring module 115, 145 monitors for the presence or absence of RTP data packets. The adjustment module 116, 146 works in conjunction with the calling module 114, 144 to terminate interrupted RTP media streams, automatically select and use a new port number, and/or initiate a secondary SIP session in accordance with embodiments further described herein. Database(s) 118, 148 are one or more structured or unstructured data repositories that store a port number selection algorithm.

Figure 2A:
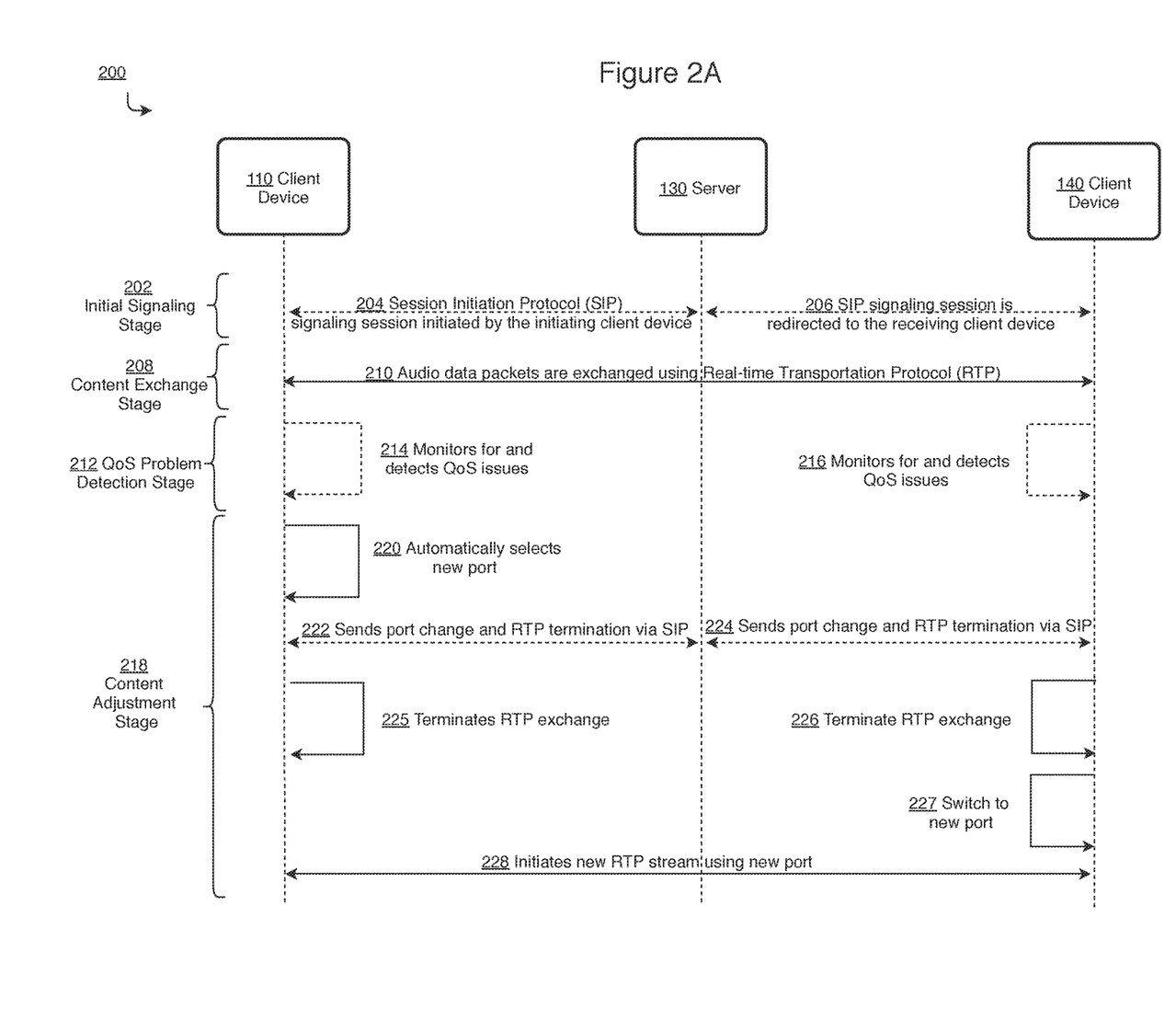
FIG. 2A and FIG. 2B are process flow diagrams depicting improved VoIP calls, according to some embodiments.

FIG. 2A is a process flow diagram depicting an improved VoIP call 200, in an example embodiment. During an initial signaling stage 202, an initiating client device 110, running the VoIP application, uses the calling module 114 to initiate a SIP signaling session with the server 130 at step 204. Since SIP is a connection management protocol, the initial signaling stage 202 of a VoIP call is where a call is being initiated, codecs are being negotiated and a general transaction of a call is being established. SIP may be Request for Comments (RFC) 3261 compliant. It is appreciated that during the initial signaling stage 202, a port (e.g. UDP port) is selected for exchanging RTP packets during the VoIP call. Specifically, SIP or a Session Description Protocol (SDP) used in parallel with SIP, may be used to communicate and determine a port for subsequent media exchanges between client devices 110, 140. At step 206, the call management application 132 running on the server 130 redirects the SIP signaling messages to the receiving client device 140 in order to signal to the receiving client device 140 that media session should be established. Subsequently, during the content exchange stage 208, the calling modules 114, 144 of both client devices 110, 140 directly exchange audio data packets at step 210 using RTP, Secure RTP (SRTP), Z and RTP (ZRTP), or any protocol used for exchanging media content. These RTP packets are monitored during the QoS problem detection stage 212. Specifically, at step 214 and step 216, the client devices 110, 140 use the content monitoring modules 115, 145 to monitor for QoS issues, such as the absence of RTP packets. The absence of RTP packets indicates that the VoIP audio stream has been interrupted, such as by a firewall. If there are no interruptions in the RTP exchange, then no adjustments are needed. However, if interruptions in the RTP exchange are detected, then the port is changed (e.g., on one side or both sides) in order to ensure better VoIP QoS. While the complete absence of RTP packets is one condition that indicates QoS issues, other conditions such as meeting a packet loss threshold, meeting a latency increase threshold, or any other condition may also be monitored for at step 214 and step 216. As described in relation to FIG. 1, in some embodiments, the ability to monitor for and detect the absence of RTP packets is limited to the client device 110 that runs the improved VoIP application 112. For example, in the event that client device 110 runs the improved VoIP application while client device 140 runs a standard VoIP application, step 214 would occur while step 216 would not occur.

In some embodiments, it may be determined that there is a QoS problem if an RTP packet is not received within a certain window of time, e.g., 5 seconds, 3 seconds, 2 seconds, etc. Specifically, the content monitoring modules 115, 145 may be preconfigured with a threshold time window. The content monitoring modules 115, 145 monitor the exact time that each RTP packet is received and calculate the time delay between receipt of each packet. If the time delay meets or exceeds the threshold time window, then there is a QoS issue and the content monitoring modules 115, 145 will trigger the adjustment modules 116, 146. In another embodiment, the content monitoring modules 115, 145 monitor for the receipt of RTP packets from time the VoIP call is established. In such an embodiment, if a delay in receiving an RTP packet from the time the call is established meets or exceeds the threshold time window, then a QoS issue exists and the content monitoring modules 115, 145 will trigger the adjustment modules 116, 146. In yet another embodiment, the content monitoring modules 115, 145 may be preconfigured with a threshold for acceptable packet loss. The content monitoring modules 115, 145 monitor for packet loss and, if the packet loss meets or exceeds the acceptable threshold, then a QoS issue exists. In yet another embodiment, the content monitoring modules 115, 145 may be preconfigured with a latency threshold for acceptable latency. The content monitoring modules 115, 145 monitor for latency and, if the latency meets or exceeds the acceptable threshold, then a QoS issue exists. Any number of QoS issues may be monitored for.

For example, if the content monitoring modules 115, 145 monitoring the RTP traffic do not detect the receipt of an RTP packet within a few seconds after a VoIP call is established or during the call or within a few seconds of receiving a previous RTP packet during a VoIP call, then it may be determined that the there is a QoS issue affecting the quality of the VoIP call. In another example, the network 120 experiences heavy bandwidth usage, resulting in the prioritization of data traffic over RTP traffic. In such an embodiment, if the content monitoring modules 115, 145 do not detect the receipt of an RTP packet within a given window of time, then it may be determined that there is a QoS issue affecting the quality of the VoIP call.

In response to determining that there are QoS issues, a new port is automatically selected and used. Specifically, during the content adjustment stage 218, the adjustment modules 116, 146 are configured to access and run a port number selection algorithm that is stored in databases 118, 148. In the example of FIG. 2A, since the content monitoring module 115 associated with client device 110 detected the QoS issue, the content monitoring module 115 works with the corresponding adjustment module 116 to automatically select a new port at step 220. It is appreciated that a new port may be selected randomly, using a random algorithm, and automatically from a range of available ports. For example, the adjustment module 116 may use the algorithm to randomly select an integer value within [50,000, 65,535]. As such, the adjustment module 116 creates a UDP socket, selects a value greater than 50,000 but less than 65,535, e.g., X, and binds the port to the selected number. If the port selection fails, then a new port is selected by performing the following operation X=(X+1) mod 65,535. This process continues until an available port is found and selected.

At step 222, the adjustment module 116 works in conjunction with the calling module 114 to send the new port number to the server 130 using SIP, SDP, or any other appropriate protocol for communicating a change in ports. An RTP termination notification is also sent to the server 130. The server 130 subsequently redirects the communication featuring the new port number and the RTP termination notification to the receiving client device 140 at step 224. In response the calling modules 114, 144 of the client devices 110, 140 terminate the RTP exchange at step 225 and step 226, and the calling module 144 of the client device 140 switches to using a new port at step 227. In some embodiments, both client devices 110, 140 switch to the same new port number. In other embodiments, the client device 140 switches to any new available port for subsequent communication. At step 228, the adjustment module 116 works in conjunction with the calling module 114 to initiate a new RTP media stream using the newly selected port number. For example, the calling module 114 of the initiating client device 110 may transmit a new RTP media stream using the new port number while the calling module 144 of the receiving client device 140 listens for the RTP packets on the same port number as the initiating client device 110.

The approach described in the example of FIG. 2A differs from traditional approaches by automating the new port selection. Moreover, the current approach does not require the initiation of a second SIP signaling session, which has the benefit of decreasing the use of processing resources that would otherwise be used in establishing a second SIP signaling session. Rather, only a second RTP media stream, using the newly selected port, needs to be established. In such an embodiment, the interruption in the exchange of audio data while a new RTP media stream is being established is minimal, which results in the benefit of little to no noticeable QoS issues for the users engaged in the VoIP call. Therefore, the quality of the VoIP call is increased while the use of processing resources is decreased.

It is appreciated that the number of client devices, the port numbers used for VoIP calls, and the number of times SIP signaling sessions and RTP media content exchanges are instantiated are for illustrative purposes and should not be construed as limiting the scope of the embodiments.

Figure 2B:
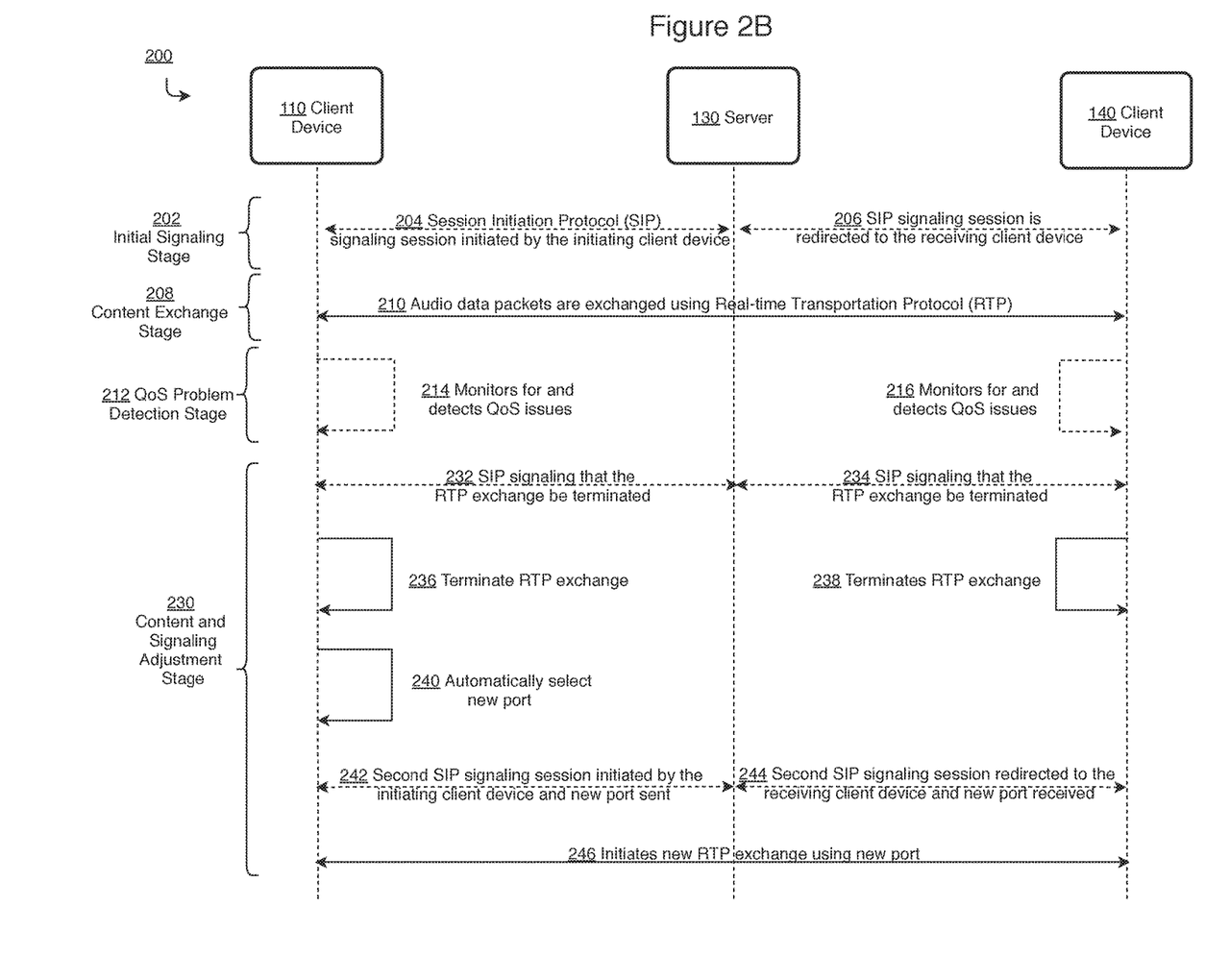

Referring now to FIG. 2B, a process flow diagram depicting a similar improved VoIP call 200 to that of FIG. 2A is shown. In this embodiment, the initial signaling stage 202, content exchange stage 208, and QoS problem detection stage 212, and all associated steps at each stage, are the same as those of FIG. 2A and described in association with FIG. 2A above. The example of FIG. 2B differs after step 214 and step 216 where the client devices 110, 140 monitor for the absence of received RTP packets. If a client device 110 fails to detect RTP packets after a certain window of time during the call or after the call has initially been established, then the call enters the content and signaling adjustment stage 230.

During this stage, the adjustment module 116 works in conjunction with the calling module 114 to signal the termination of the RTP exchange using SIP, SDP, or any other appropriate protocol at step 232 and step 234. Subsequently, the RTP exchange is terminated at step 236 and at step 238. The client device 110 then uses the adjustment module 116 to access and run the port number selection algorithm that is stored in databases 118, 148. In the example of FIG. 2B, the content monitoring module 115, which detected the QoS issue, works with the corresponding adjustment module 116 to automatically select a new port at step 240, in accordance with the embodiments previous described herein. At step 242 of the content and signaling adjustment stage 230, a second SIP signaling session is initiated by the initiating client device 110 and the new port is communicated to the server 130. At step 244, the second SIP signaling session is redirected to the receiving client device 140 and the new port number is received. At step 246, the adjustment module 116 works in conjunction with the calling module 114 to initiate a new RTP media stream that was selected at step 140. For example, the calling module 114 of the initiating client device 110 may transmit a new RTP media stream using the new port number while the calling module 144 of the receiving client device 140 listens for the RTP packets on the same port number as the initiating client device 110.

Figure 3:
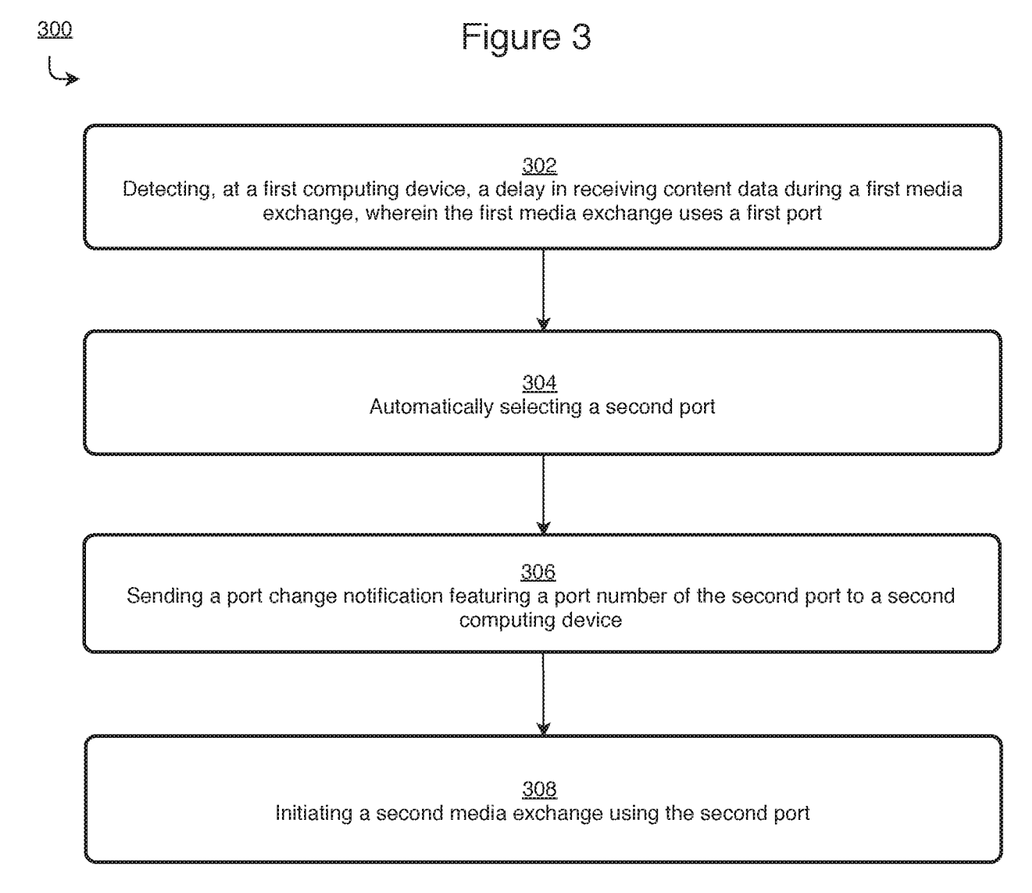
FIG. 3 is a flow chart illustrating an example method flow for establishing a VoIP call, in accordance with some embodiments.

Referring now to FIG. 3, a flow chart illustrating an example method flow 300 for establishing a VoIP call in accordance with some embodiments is shown. At step 302, a delay in receiving content data during a first media exchange is detected at a first computing device. The first computing device may be, for example, client device 110. The content data received may be RTP audio packets or any other packets that are exchanged during VoIP communications. In an embodiment, a first port that is associated with a first port number is used for the exchange of RTP packets. The delay in receiving those packets may be determined based on a predetermined time window threshold, a latency threshold, or any other threshold used in determining the presence of a QoS issue.

At step 304, in response to detecting the delay in receiving content data, a second port is automatically selected. Automatically selecting the second port may include using a port selection algorithm, as previously described herein. The port selection algorithm may randomly select a port number from a set range of port numbers. The first computing device may create a new UDP socket and attempt to bind the UDP socket to the randomly selected port number. In the event that a newly created UDP socket fails to bind with the selected port number, the algorithm increases the port number by an incremental number until the UDP socket binds with the port number.

At step 306, in response to automatically selecting the second port, a port change notification featuring the port number of the second port is sent to a second computing device. For example, the newly selected port number and a notification of the port change to the newly selected port number may be communicated via SIP, SDP, or any other applicable protocol from the first client device 110 to a server 130 that then forwards the notification to a second client device 140. At step 308, in response to sending the port change notification, a second media exchange is initiated using the second port. For example, a second exchange of RTP packets is initiated using the newly selected port number.

It is appreciated that in some embodiments, the port may randomly be changed by initiating another SIP signaling session. However, in some embodiments, the port may randomly be changed to a different port without initiating another SIP signaling session.

Figure 4:
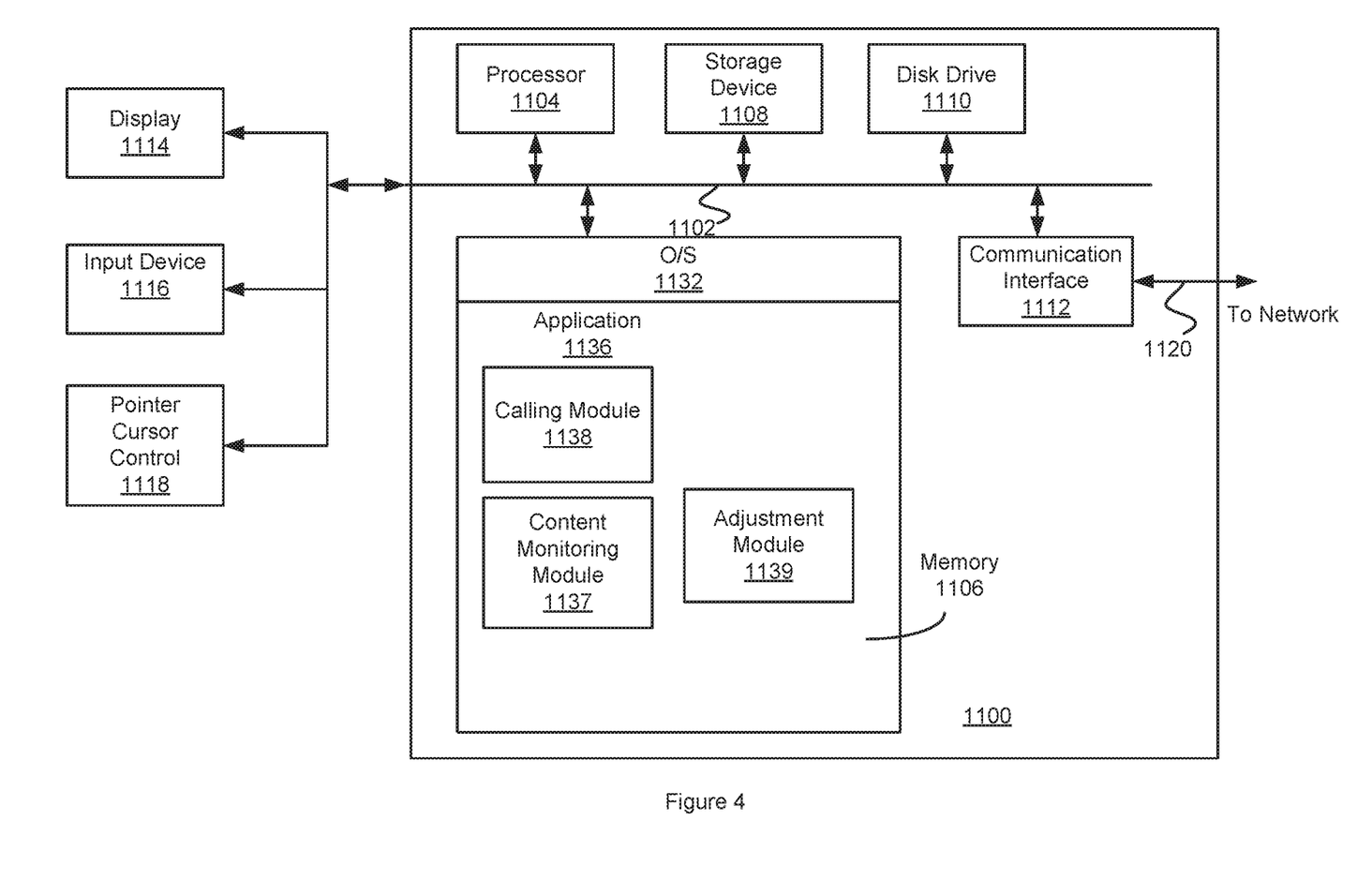
FIG. 4 is a block diagram depicting an example computer system suitable for establishing a VoIP call in accordance with some embodiments.

Referring now to FIG. 4, a block diagram depicting an example of computer device suitable for establishing a VoIP call and addressing voice quality issues is shown. This can be one of computer devices 110 or 140 or server 130. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes a calling module 1138 that initiates a session (SIP), as described above in FIGS. 1-3. The application 1136 further includes a content monitoring module 1137 to monitor RTP traffic to determine whether an RTP packet loss within a predetermined window of time has occurred. The application 1136 further includes an adjustment module 1139 that terminates interrupted RTP media streams, automatically selects and uses a new port number, and/or initiates a secondary SIP session. It is appreciated that the operation of the calling module 1138, content monitoring module 1137, and the adjustment module 1139 are described in detail with respect to FIGS. 1-3.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks™, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method for improving Voice over Internet Protocol (VoIP) call quality, the method comprising:
    detecting, at a first computing device, a delay in receiving content data during a first media exchange, wherein the first media exchange uses a first port;
    automatically selecting, by the first computing device, a second port upon the detection of the delay that meets or exceeds a time threshold;
    sending a port change notification featuring a port number of the second port to a second computing device; and
    initiating a second media exchange using the second port, wherein the second port is different from the first port.
2. The method of claim 1, further comprising:
    sending a first media exchange termination notification and terminating the first media exchange.
3. The method of claim 1, further comprising:
    initiating a first Session Initiation Protocol (SIP) signaling session to initiate the first media exchange; and
    initiating a second SIP signaling session.
4. The method of claim 1, wherein the time threshold is a predetermined time window threshold.
5. The method of claim 1, wherein the time threshold is a latency threshold.
6. The method of claim 1, wherein automatically selecting the second port comprises randomly selecting the port number from a set range of port numbers.
7. The method of claim 1, wherein the first media exchange and the second media exchange comprise an exchange of Real-time Transport Protocol (RTP) packets.

8. A non-transitory, computer-readable medium storing a set of instructions for improving Voice over Internet Protocol (VOIP) call quality that, when executed by a processor, cause:
    detecting, at a first computing device, a delay in receiving content data during a first media exchange, wherein the first media exchange uses a first port;
    automatically selecting, by the first computing device, a second port upon the detection of the delay that meets or exceeds a time threshold;
    sending a port change notification featuring a port number of the second port to a second computing device; and
    initiating a second media exchange using the second port, wherein the second port is different from the first port.
9. The non-transitory, computer-readable medium of claim 8, storing a set of further instructions that, when executed by the processor, cause:
    sending a first media exchange termination notification and terminating the first media exchange.
10. The non-transitory, computer-readable medium of claim 8, storing a set of further instructions that, when executed by the processor, cause:
    initiating a first Session Initiation Protocol (SIP) signaling session to initiate the first media exchange; and
    initiating a second SIP signaling session.
11. The non-transitory, computer-readable medium of claim 8, wherein the time threshold is a predetermined time window threshold.
12. The non-transitory, computer-readable medium of claim 8, wherein the time threshold is a latency threshold.
13. The non-transitory, computer-readable medium of claim 8, wherein automatically selecting the second port comprises randomly selecting the port number from a set range of port numbers.
14. The non-transitory, computer-readable medium of claim 8, wherein the first media exchange and the second media exchange comprise an exchange of Real-time Transport Protocol (RTP) packets.
15. A system for improving Voice over Internet Protocol (VoIP) call quality, the system comprising:
    a processor;
    a memory operatively connected to the processor and storing instructions that, when executed by the processor, cause:
    detecting, at a first computing device, a delay in receiving content data during a first media exchange, wherein the first media exchange uses a first port;
    automatically selecting, by the first computing device, a second port upon the detection of the delay that meets or exceeds a time threshold;
    sending a port change notification featuring a port number of the second port to a second computing device; and
    initiating a second media exchange using the second port, wherein the second port is different from the first port.
16. The system of claim 15, wherein the memory stores further instructions that, when executed by the processor, cause:
    sending a first media exchange termination notification and terminating the first media exchange.
17. The system of claim 16, wherein the memory stores further instructions that, when executed by the processor, cause:
    initiating a first Session Initiation Protocol (SIP) signaling session to initiate the first media exchange; and
    initiating a second SIP signaling session.
18. The system of claim 16, wherein the time threshold is a predetermined time window threshold.

19. The system of claim 16, wherein the time threshold is a latency threshold.

20. The system of claim 16, wherein automatically selecting the second port comprises randomly selecting the port number from a set range of port numbers.

\* \* \* \* \*